US011200726B2

(12) United States Patent
Baker et al.

(10) Patent No.: US 11,200,726 B2
(45) Date of Patent: Dec. 14, 2021

(54) SCANNING SUSPENSION BOX

(71) Applicant: Hewlett-Packard Development Company, L.P., Spring, TX (US)

(72) Inventors: Mary G. Baker, Palo Alto, CA (US); Walter Flores Pereira, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/755,608

(22) PCT Filed: Jan. 11, 2018

(86) PCT No.: PCT/US2018/013303
§ 371 (c)(1),
(2) Date: Apr. 13, 2020

(87) PCT Pub. No.: WO2019/139590
PCT Pub. Date: Jul. 18, 2019

(65) Prior Publication Data
US 2020/0364922 A1  Nov. 19, 2020

(51) Int. Cl.
*G06T 15/08* (2011.01)
*H04N 1/036* (2006.01)
(52) U.S. Cl.
CPC .............. *G06T 15/08* (2013.01); *H04N 1/036* (2013.01)
(58) Field of Classification Search
CPC ..... G06T 15/08; H04N 1/036; H04N 1/00827
See application file for complete search history.

(56) References Cited

U.S. PATENT DOCUMENTS

| | | | |
|---|---|---|---|
| 2,127,590 A * | 8/1938 | Erwood | G03B 31/00 353/17 |
| 4,664,266 A * | 5/1987 | Fausett | A47B 96/022 211/87.01 |
| 6,081,269 A | 6/2000 | Quarendon | |
| 6,980,690 B1 | 12/2005 | Taylor et al. | |
| 8,217,941 B2 | 7/2012 | Park et al. | |
| 9,237,329 B1 | 1/2016 | Poursohi et al. | |
| 9,807,373 B1 | 10/2017 | Bruce et al. | |
| 2007/0035539 A1* | 2/2007 | Matsumura | G06T 7/564 345/419 |
| 2012/0020516 A1* | 1/2012 | Lee | G06K 9/00771 382/103 |

(Continued)

FOREIGN PATENT DOCUMENTS

| | | |
|---|---|---|
| EP | 3263316 A1 | 1/2018 |
| JP | 2007033264 | 2/2007 |

OTHER PUBLICATIONS

Profound3D, "Matter and Form Portable 3D scanner", published at https://profound3d.com/products/matter-and-form-portable-3d-scanner as of Jun. 29, 2016, as recorded on www.archive.org (Year: 2016).*

*Primary Examiner* — William A Beutel
(74) *Attorney, Agent, or Firm* — Nwamu PC

(57) ABSTRACT

A scanning suspension box is disclosed, enabling the creation of a 3D model of an object. The box is a sealable enclosure for receiving the object to be scanned. A camera coupled to a surface of the enclosure images the object to generate a three-dimensional model of the object, which does not move once contained in the box.

13 Claims, 9 Drawing Sheets

(56) References Cited

U.S. PATENT DOCUMENTS

| | | | | |
|---|---|---|---|---|
| 2016/0185047 A1* | 6/2016 | Windau | ............... | B29C 64/106 |
| | | | | 358/406 |
| 2017/0119507 A1* | 5/2017 | Escobar | ................ | A61C 13/34 |
| 2017/0291372 A1 | 10/2017 | Milshtein et al. | | |
| 2018/0338129 A1* | 11/2018 | Hejl | ..................... | H04N 13/239 |
| 2019/0063917 A1* | 2/2019 | Hart | .................... | G03B 17/561 |
| 2020/0089097 A1* | 3/2020 | Eckhouse | ............... | G06T 7/579 |

\* cited by examiner

100A

100B

Capture Hardware 114

◯ Camera 202

▨ Light 204

◎ Depth Sensor 206

200A

300

SCANNING SUSPENSION BOX

BACKGROUND

Three-dimensional (3D) computer modeling is a mechanism by which an object is rendered in digital form. A 3D model of the object is obtained, usually by capturing images of the object from several different angles.

There are many compelling reasons for people to capture 3D models of objects. Growth in 3D printing, 3D cinematography, and Virtual Reality applications are a few examples. Over time, the desire for 3D scanning is expected to become commonplace, even in homes and small businesses.

DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1A or 1B, numbers in the 200 series refer to features originally found in FIG. 2A or 2B, and so on.

DETAILED DESCRIPTION

In accordance with examples described herein, a scanning suspension box is disclosed, enabling the creation of a 3D model of an object. The box contains cameras, depth sensors, and lights mounted on its inside walls in known positions within the box. In another example, the cameras, depth sensors, and lights are mounted along tracks along the inside walls, and are thus movable within the box. The box includes means, such as netting, to hold the object in suspension once dropped inside the box. Interior walls of the enclosure are made of non-reflective material. Images of the object are obtained by the cameras, depth sensors, and lights. Because their characteristics are known, images of the background walls and suspension means can be subtracted out from object images, thus simplifying the generation of the 3D model.

Figure 1A:
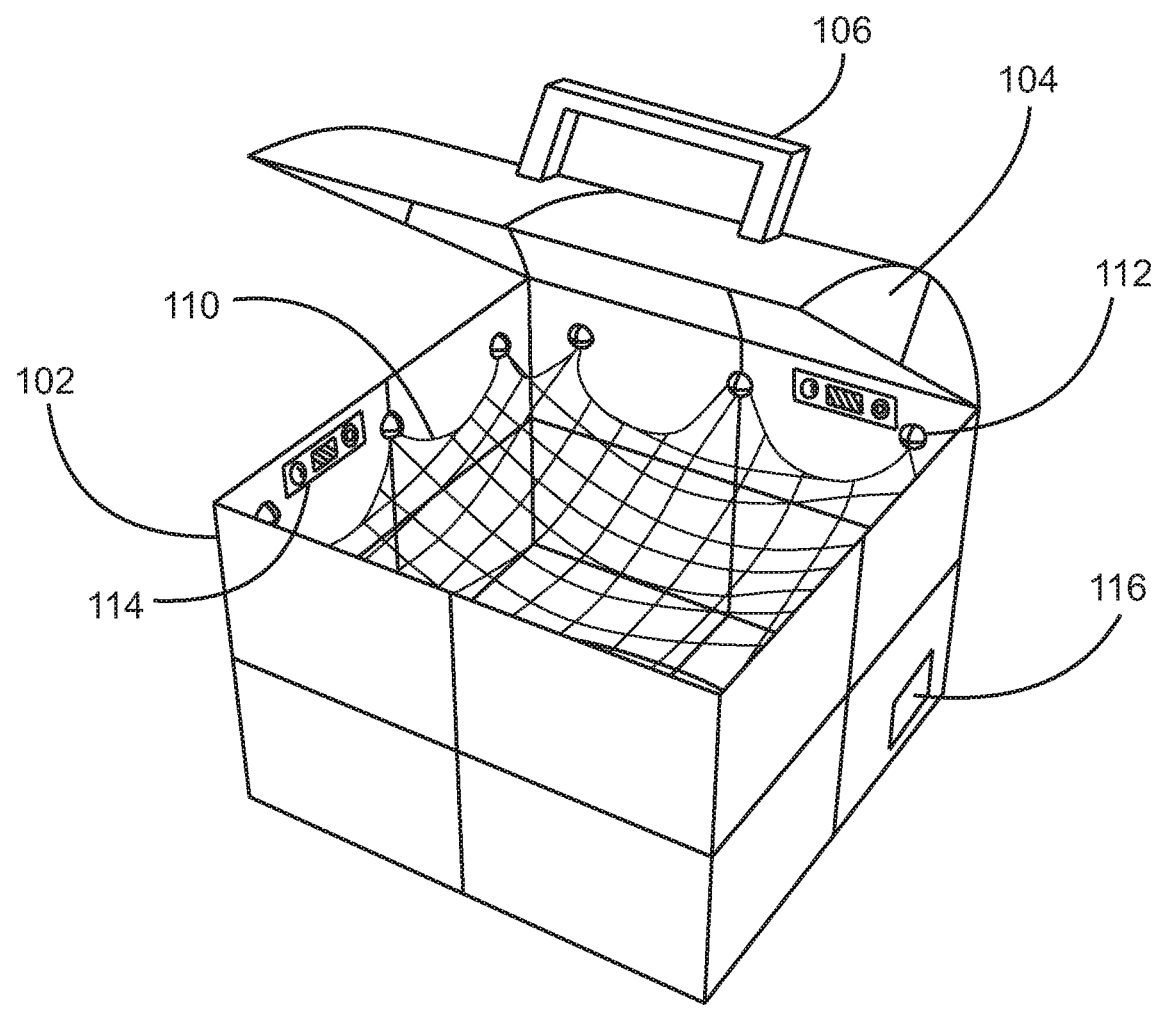
FIGS. 1A and 1B are simplified diagrams of a scanning suspension box, according to some examples.
Figure 1B:
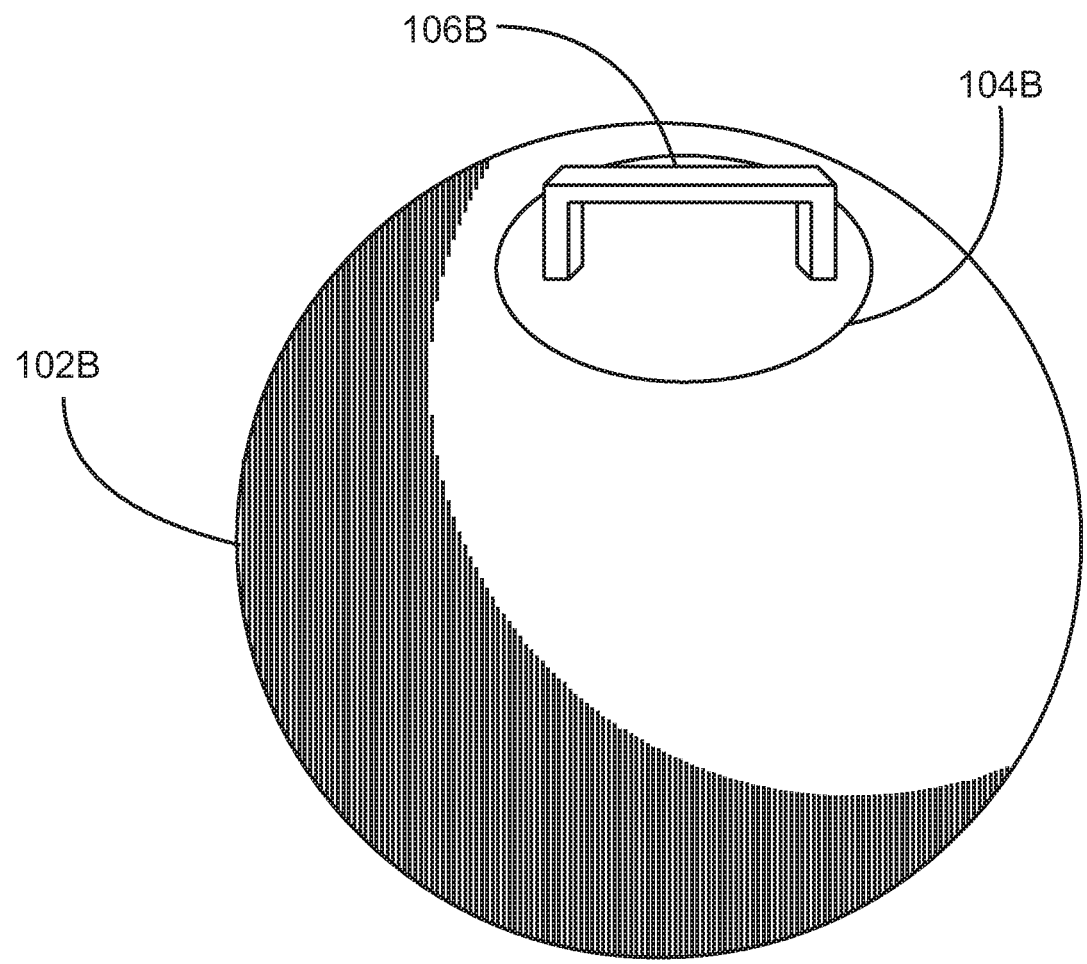

FIGS. 1A and 1B are simplified diagrams of scanning suspension boxes 100A and 100B, respectively, according to some examples, for receiving an object to be rendered in three dimensions. In FIG. 1A, the scanning suspension box 100A is an enclosure 102 with a lid 104, and looks a bit like a lunchbox. In FIG. 1B, scanning suspension box 100B (collectively, "scanning suspension box 100", "scanning box 100", "suspension box 100" or "box 100") features an enclosure 102B and lid 104B which form a circular shape (collectively, "enclosure 102" and "lid 104").

The enclosure 102 (and lid 104, where present) of the scanning suspension box 100 may be constructed in any of a number of different shapes, including but not limited to, a cube, a rectangular cube, a prism, a pyramid, a spherical shape, a cylindrical shape, a conical shape, a clamshell shape, a polyhedron shape (of which there are many types), and an irregular shape, among others. Many of these shapes will have a separate lid, but some of them may open without a lid, such as a rectangular cube in which one side slides open and shut. The scanning suspension box 100 may include a handle 106, such as for those implementations that are sized for portability.

Once the object to be 3D rendered is put in the box and the lid (if present) is closed, the scanning suspension box 100 is considered sealed shut. Operation of the scanning suspension box 100 may manually or automatically start at this time (operating state).

Inside the scanning suspension box, as illustrated in FIG. 1A, is a suspension material 110, such as netting. In this example, the netting 110 is attached to the walls of the enclosure 102 by securing means 112, such as bolts or screws. In other examples, the netting 110 may be glued to the walls of the enclosure. In an example, the suspension material 110 may include a sparse net of fine material, for example, less than about 0.5 mm in diameter, such as filaments made from a variety of materials such as nylon, cotton, silk, elastomeric polymers, and so on.

In an example, the suspension material 110 is of a predetermined color, such as green, to provide contrast to the object being imaged. The predetermined color facilitates removal of the suspension material 110 from the captured images by software using chromakey techniques. Chromakey compositing, or chroma keying, is a visual effects/post-production technique for compositing or layering two images together based on color hues (a chroma range). The technique is also known as color keying or color separation overlaying.

In an example, the suspension material 110 is adjustable to be more taut, such as when the object is heavier than average, or less taut, such as when the object is larger than average. In another example, the tension of the suspension material 110 is such that the object, once placed in the scanning suspension box 100, is approximately equidistant from each of the faces of the enclosure.

In another example, the suspension material 110 consists of a solid, clear surface, such as a glass, acrylic, or polycarbonate surface, among others, upon which the object is disposed. In still another example, the suspension material 110 consists of a sheet of transparent, flexible material, such as cling wrap, to receive the object being imaged.

The cost of 3D computer modeling may be prohibitive for the typical consumer. High-end scanners, for example, provide very precise 3D models, but are prohibitively expensive for some applications. Lower-cost scanning applications involve positioning and repositioning of the object, and do not work well for scanning flexible or soft objects, such as children's artwork using string and other non-rigid features.

The scanning suspension box 100 may be a home or small business appliance that makes it easier and faster to image objects, for example, for constructing a 3D model of the scanned object. A user may open the box by lifting the lid 104, deposit the object upon the suspension material 110 such that the object is suspended by the suspension material, such as the netting 110, inside the box, and close the lid. From the user's perspective, succeeding operations of image capture, as described below and illustrated in FIGS. 3 and 4, may occur automatically once the lid is closed. In some examples, the user may activate a control on the box, or on an attached compute device, to start the scan. The image data thus obtained enables post-processing software to create the 3D model of the object for the user.

Because the object does not need to be moved, the scanning suspension box 100 may scan both rigid and non-rigid objects, such as string or feathers. Further, with some scanning methods, the background may be captured separately from the object. During generation of the 3D model, the background is subtracted from the object image. With the scanning suspension box 100, the background, e.g., the interior surfaces of its enclosure 102, is known and stable. Thus, an additional background capture step can be avoided. Also, as described further below, lighting conditions can be controlled and kept stable inside the scanning suspension box 100.

Returning to FIG. 1A, the scanning suspension box 100 includes capture hardware 114. The capture hardware 114 is disposed strategically throughout the enclosure 102 to image the object being held in the suspension material 110 from several different angles.

Figure 2A:
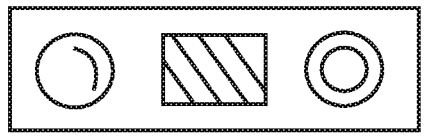
FIG. 2A is a simplified diagram of capture hardware used by the scanning suspension box of FIG. 1A, according to some examples.

In FIG. 2A, the capture hardware 114 is illustrated schematically and consists of a camera 202, a light 204, and a depth sensor 206. Although these devices are illustrated as being part of a package, as described with respect to the capture hardware 114 of FIG. 1A, they may be mounted in the enclosure 102 together or separately. For example, a single light 204 may be used with multiple cameras 202, such as all of the cameras on one side of the enclosure 102.

An object is suspended inside the scanning suspension box 100 so that the cameras 202 and depth sensors 206 mounted on the inside walls of the box can capture object images from up to several different directions. In an example, the object is suspended in a way that prevents movement of the object. In a second example, the position of the object, once placed in the scanning suspension box 100, does not significantly obscure parts of the object that need to be captured.

Also featured in FIG. 1A is an optional control unit 116. The control unit 116 may include functionality sufficient to control the capture hardware 114, store captured images, render the 3D model of the object being scanned, and connect to other hardware, such as a laptop or other processor-based system. In some examples, the control unit 116 may include fewer features. In a minimal configuration, for example, the control unit 116 provides an interface to a processor-based system capable of performing the other functions, once connected to the scanning suspension box 100. In another example, the control unit 116 controls the capture hardware 114, stores the captured image data, and connects to a processor-based system, upon which rendering operations are performed.

Figure 2B:
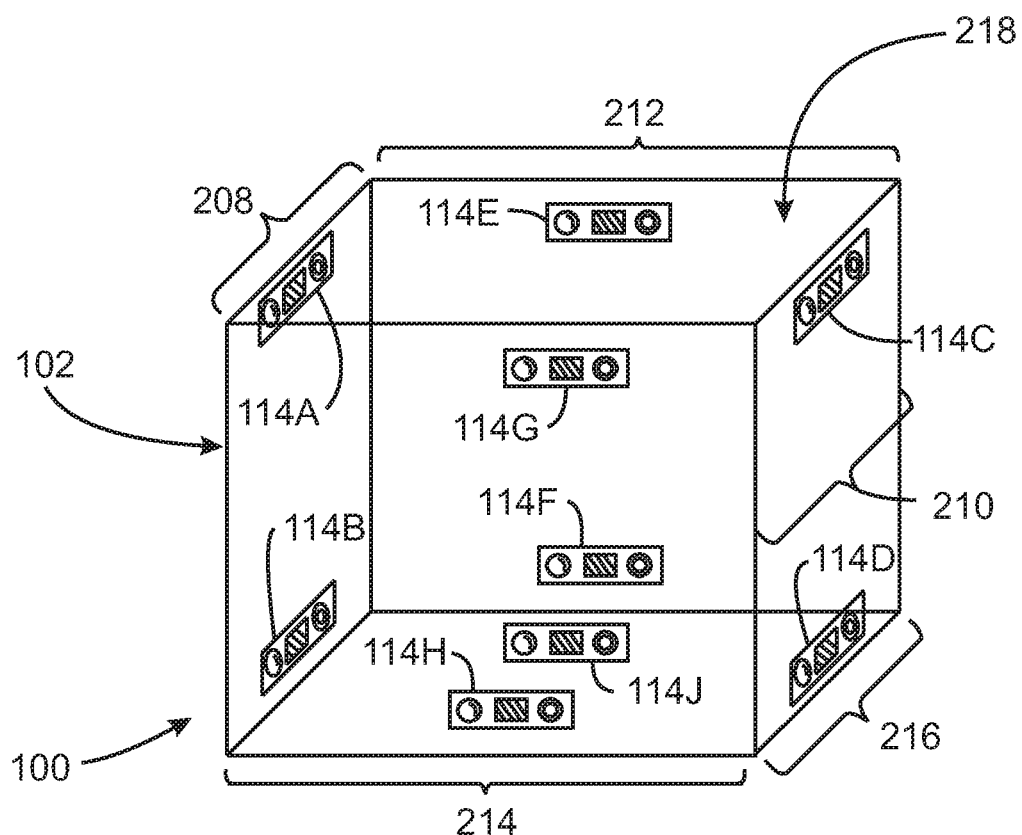
FIG. 2B is a transparent view of the scanning suspension box of FIG. 1A, according to some examples.

FIG. 2B is a transparent view 200 of the scanning suspension box 100 of FIG. 1A (illustrated without the lid 104 for simplicity), according to some examples. In this example, the bottom portion of the enclosure 102 is a topless rectangular cube, featuring a first surface 208 (e.g., left side), a second surface 210 (e.g., right side), a third surface 212 (e.g., back side), a fourth surface 214 (e.g., front side), a fifth surface 216 (e.g., bottom side), and a sixth surface 218 (e.g., top side).

Capture hardware 114 is attached to these walls so as to surround the object, once suspended inside the box, from several different angles. In FIG. 2B, capture hardware 114A and 114B are disposed at the top and the bottom, respectively, of the first surface 208; capture hardware 114C and 114D are disposed at the top and bottom, respectively, of the second surface 210; capture hardware 114E and 114F are disposed at the top and bottom, respectively, of the third surface 212; capture hardware 114G and 114H are disposed at the top and bottom, respectively, of the fourth surface 214; and capture hardware 114J is disposed on the fifth surface 216 (collectively, "capture hardware 114"). In this example, there are nine instances of capture hardware 114, positioned so as to surround the object to be suspended in the scanning suspension box 100 (not shown). In other examples, the scanning suspension box 100 may include four instances of capture hardware, that is, four cameras 202, four lights 204, and four depth sensors 206.

The cameras 202 and depth sensors 206 are the mechanisms by which images of the object are obtained. A camera obtains an image of an object at a particular angle. One type of depth sensor, by contrast, uses a laser light to project a pattern on the object and then, by the distortion of this pattern that's projected, infers the shape of the object. Another type of depth sensor uses time-of-flight measurements to obtain information about the object. In the scanning suspension box 100, both the cameras 202 and the depth sensors 206 utilize the lights 204 to perform image capture. In some examples, each depth sensor 206 obtains several measurements by measuring the depth to many points on the surface of the object being scanned.

In some examples, cameras 202, lights 204, and depth sensors 206 are mounted on the inside walls of the scanning box enclosure 102 so their positions can be efficiently calibrated. There is a tradeoff between the expense of mounting more cameras and sensors inside the box to capture more directions of the object versus having fewer, but repositionable, cameras and sensors, an option that would be available if the enclosure includes tracks. In the latter situation, the cameras/sensors can be automatically repositioned, perhaps along tracks on the inside walls, but this takes a little longer and may be less accurate and less robust, although flatbed scanners can also include moving parts.

The captured images will be rendered as a three-dimensional object during post-processing. In some examples, a higher number of captured images, particularly where those images are captured from a variety of angles relative to the object being imaged, will result in less post-processing; alternatively, where there are fewer available images being taken, more post-processing takes place, to render the imaged object in three dimensions.

The size of the object (the volume of the enclosure 102) of the scanning suspension box 100 may be another consideration. For the capture hardware 114 to be effective, as described further below, the object being rendered may not substantially occupy the volume of the enclosure 102. For some home or small business environments, the scanning suspension box 100 may be small enough to carry around easily (for example, approximately 1-foot by 1-foot by 18 inches in dimension). Or, the box may be more substantial in size (for example, 1-meter by 2-meter by 1-meter in dimension). Or, the box may be very large (for example, 10-foot by 15-foot by 10-foot in dimension). Whatever the size of the scanning suspension box 100, the size of the objects capable of being scanned would be adjusted accordingly, with the larger versions having a larger range of object sizes that could be scanned.

Figure 3:
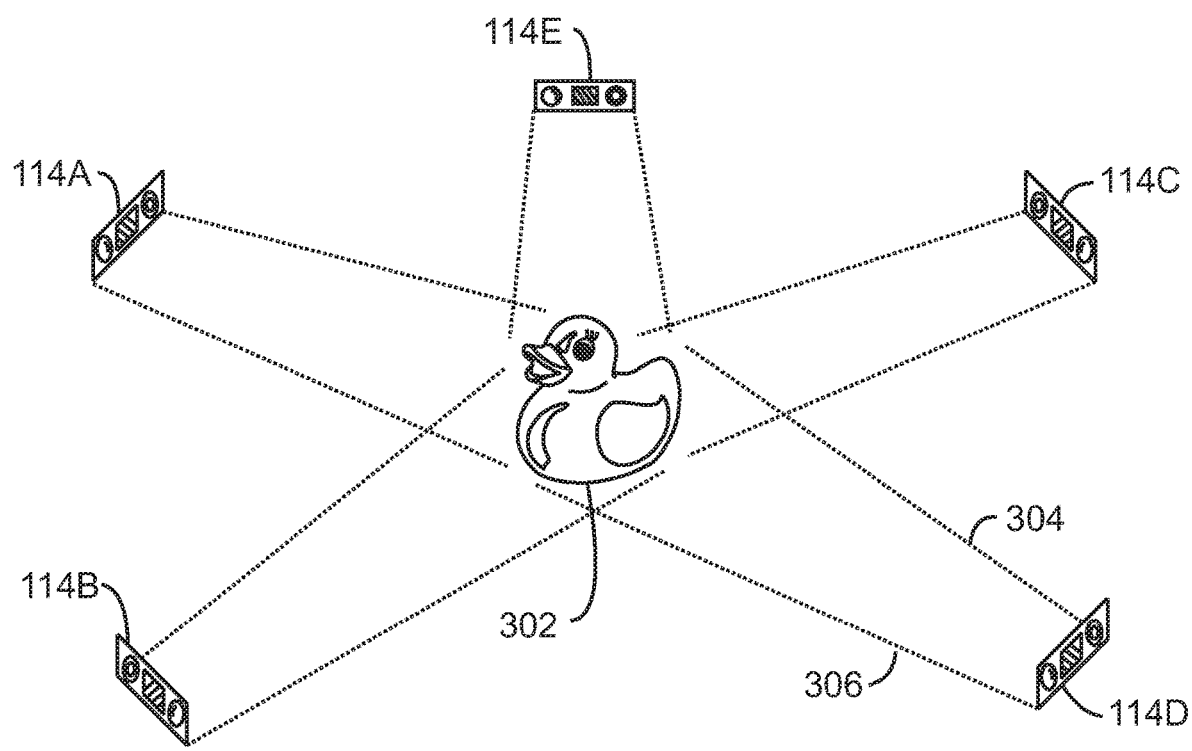
FIG. 3 is a simplified diagram showing how capture hardware disposed in different locations of the scanning suspension box of FIG. 1A captures different views of the object being rendered, according to some examples.

In FIG. 3, an example 300 shows an object 302 surrounded by capture hardware 114A-114E, as described with respect to FIG. 2A, above. Imaging paths 304 and 306 (field of view) are depicted between the object 302 and capture hardware 114D. Each imaging path results in a different image being taken of the object 302 by respective capture hardware. In some examples, each unit in the capture hardware unit 114 separately performs image capture, at a different point in time, relative to the other capture hardware of the scanning suspension box 100.

In general, depth sensors 206 are positioned a minimum distance from the subject being imaged, although improvements in technology have resulted in smaller and smaller distances. In one example, the capture hardware 114 is not less than a predefined distance from the object being imaged.

Once the images are obtained, the image data is stored, for later post-processing. In one example, the scanning suspension box 100 includes a non-volatile storage medium, such as a flash drive, for storing the image data. In a second example, the scanning suspension box 100 includes a connector for coupling to an external hard drive, for storing the image data, for example, a USB connector or a Firewire connector, such as where high-speed transfers are desired. In a third example, the scanning suspension box 100 includes a connector for coupling to a laptop computer, where the laptop computer contains non-volatile storage media for storing the image data.

In other examples, the scanning suspension box 100 is connectable to a network, whether wired or wirelessly, for storing image data. The scanning suspension box 100 may include an Ethernet port, for example, for a wired connection to an external device having storage. The scanning suspension box 100 may be WiFi- or Bluetooth-capable, for a wireless connection to an external device having storage. Where storage is not present on the box, system designers of ordinary skill in the art recognize myriad mechanisms by which the scanning suspension box may be directly or indirectly connected to media for storing the image data.

Figure 4:
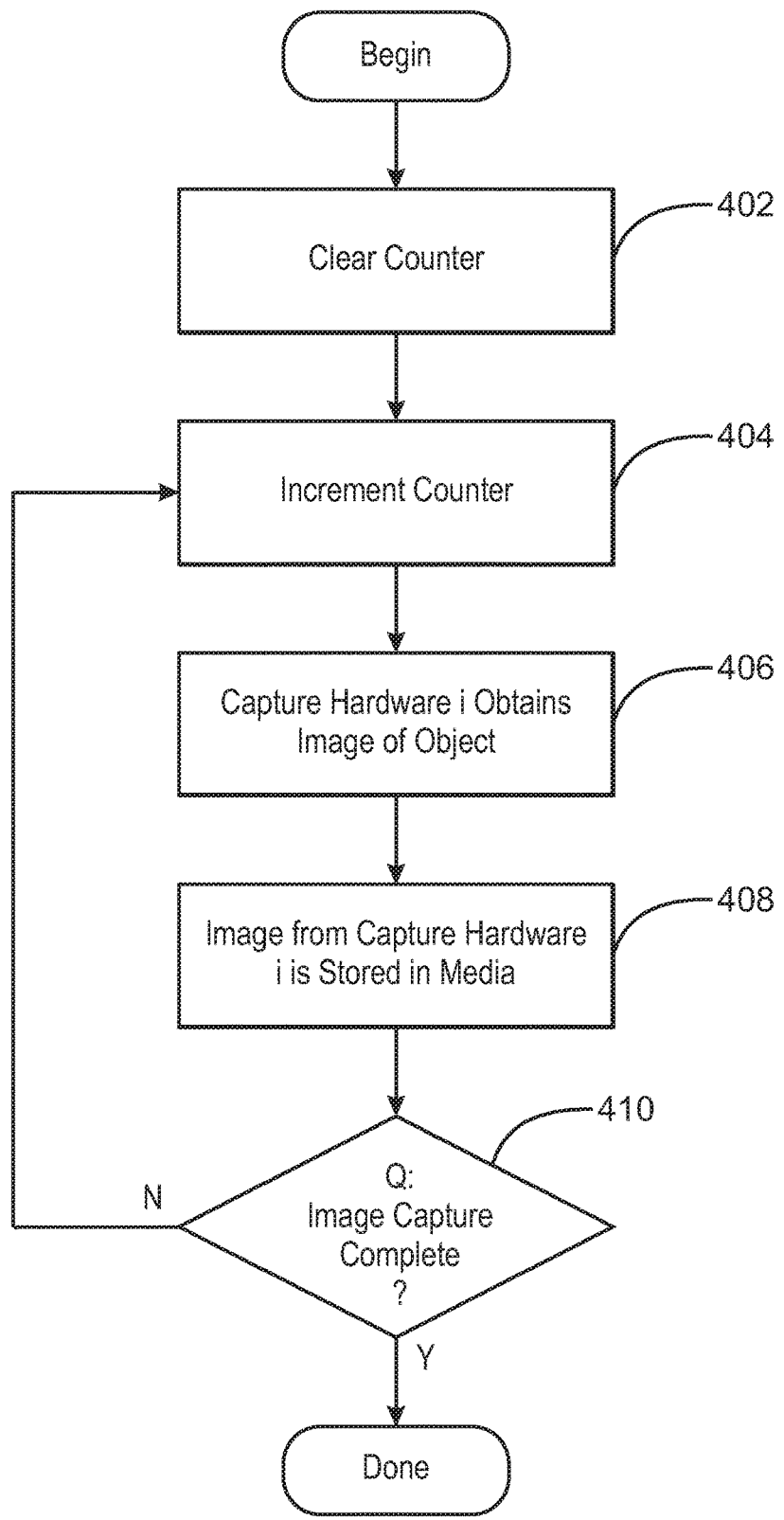
FIG. 4 is flow diagram showing coordination of capture hardware in the scanning suspension box of FIG. 1A, according to some examples.

FIG. 4 is a flow diagram 400 of a method 400 showing an image capture operation, in accordance with examples. The method 400 may be performed using the capture hardware of the scanning suspension box 100 described with respect to FIG. 1A. In the method 400, the image capture from each camera 202 or depth sensor 206 may be timed to occur in a different moment so that the lights 204 for one camera (or a laser from a depth sensor) do not interfere with the image captured by the other capture hardware.

In the flow diagram 400, there is assumed to be $i_{max}$ capture hardware units present. The method 400 begins when the image counter, i, is set to zero before a scan operation (block 402), and then incremented (block 404). The capture hardware obtains an image of the object present in the scanning suspension box 100 (block 406). The image data obtained may be stored on a medium that is either part of the scanning suspension box, coupled to the scanning suspension box, or in a laptop or other computing device that has its own storage media (block 408). If all capture hardware units have imaged the object (query 410), for example, $i=i_{max}$ the process is complete. Otherwise, the process is repeated until all capture hardware units 114 have obtained an image; in other words, i is equal to the number of capture hardware units 114 in the scanning suspension box 100.

Growth in 3D printing, 3D cinematography, and Virtual Reality applications are happening at such a pace that, over time, the desire for 3D scanning may become commonplace, even for home consumers and small business enterprises. The scanning suspension box 100 may allow unsophisticated users the ability to obtain images that can be rendered in three dimensions.

The scanning suspension box 100 has a number of benefits that may be comparable to flatbed scanners, which perform two-dimensional capture. For example, the scanning suspension box 100 provides a controlled optical environment, which provides better image data than would happen if the object is simply photographed. Additionally, the object is held still for image capture in the scanning suspension box. Non-rigid objects are particularly challenging in image capture, but the scanning suspension box 100 is capable of imaging such objects. In legacy operations, a non-rigid object may be repositioned for capture from different angles. Each repositioning can change the shape of the non-rigid object in a way that would make compositing a three-dimensional image of the object from the multiple images challenging.

Figure 5:
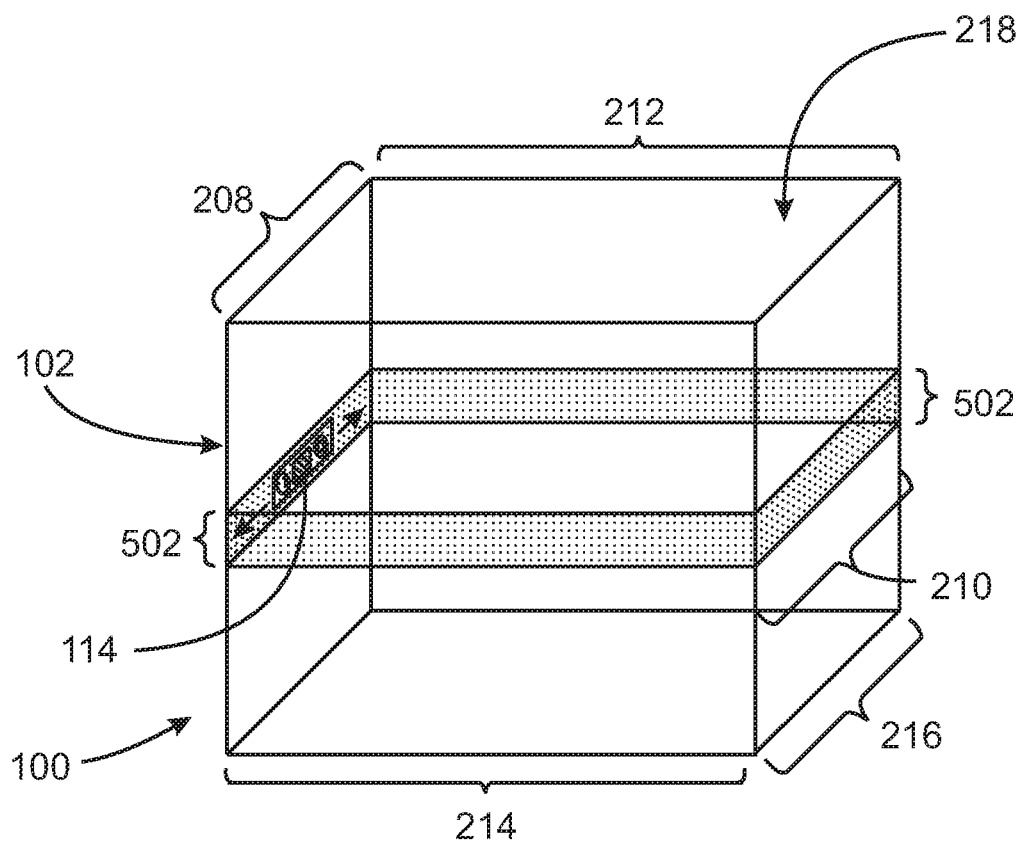
FIG. 5 is a second transparent view of the scanning suspension box of FIG. 1A including tracks for movable capture hardware, according to some examples.

FIG. 5 is a transparent view 500 of the scanning suspension box 100 of FIG. 1A, illustrated without a lid for simplicity, according to some examples. A track 502 may be disposed along the first surface 208 (e.g., left side), the third surface 212 (e.g., back side), the second surface 210 (e.g., right side), and the fourth surface 214 (e.g., front side). For ease of illustration, the track 502 is shown in the middle of the surfaces, and is not shown on the top and bottom surfaces. In one example, the track 502 is disposed at the top of the surfaces. In another example, separate tracks 502 may be disposed at both the top and bottom of the surfaces. In another example, the track 502 may be placed on the bottom and or top inside surfaces of the scanning suspension box 100.

With the track 502, the capture hardware 114 may move around the enclosure 102 of the scanning suspension box 100. For example, the capture hardware 114 may move left to right along the first surface 208, as indicated by the arrows. In another example, the capture hardware 114 may move along the first surface 208 to the third surface 212, then to the second surface 210, then to the fourth surface 214. In other words, the capture hardware 114 may be moved around the interior of the enclosure 102, limited by the location of the track 502. In an example, movement of the capture hardware 114 is limited to a single surface, such as the first surface 208. In other words, in this example, the capture hardware 114 does not "turn corners" inside the scanning suspension box 100. In other examples, the capture hardware 114 does move between different surfaces of the scanning suspension box 100 and thus does "turn corners".

Figure 6:
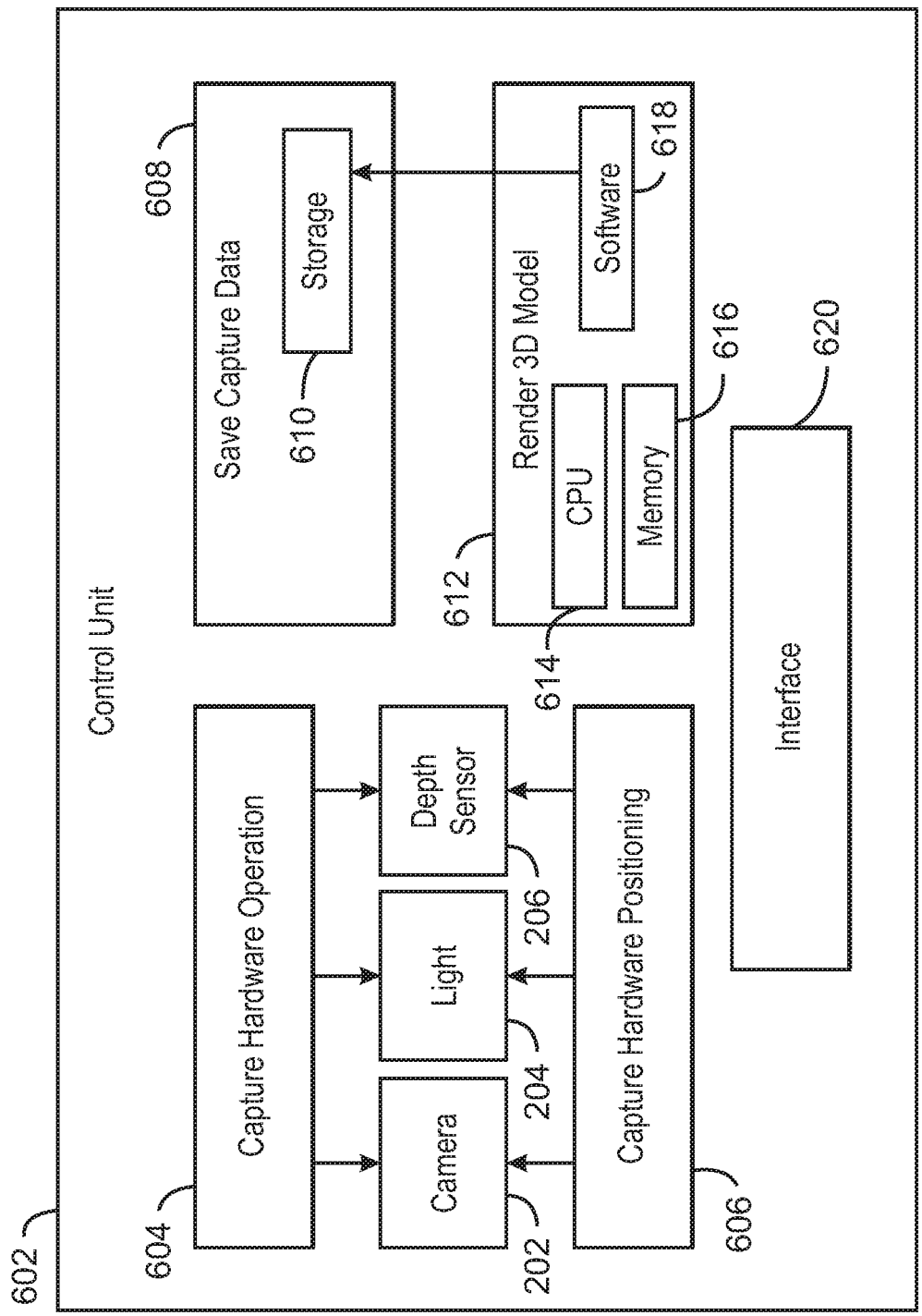
FIG. 6 is a simplified block diagram of a control unit used to operate the capture hardware of the scanning suspension box of FIG. 1A, according to some examples.

FIG. 6 is a simplified block diagram 600 of a control unit or mechanism 602 of the scanning suspension box 100, according to examples. Like the control unit 116 in FIG. 1A, the control mechanism 602 may perform several different operations, a single operation, or something in between. In an example, the control unit 602 controls the operation 604 of the capture hardware 114, such as turning on or off the cameras and depth sensors, coordinating the operation of the light 204 with its respective cameras 202, and operating the laser light(s) associated with the depth sensors 206. The process steps illustrated in FIG. 4, for example, may be controlled by the operation 604 portion of the control unit 602.

The control unit 602 further may control positioning 606 of the capture hardware 114, such as where the capture hardware is mounted on track(s) 502 (FIG. 5). The capture hardware positioning 606 may control an angle of a camera 202, light 204, or depth sensor 206. When the capture hardware 114 is moved along the track 502, the control unit 602 is apprised of the change in location, since the location of the capture hardware is to be well-calibrated before imaging operations are to take place.

Further, the control unit 602 may save the capture data 608 of the images obtained by the capture hardware 114. Thus, storage 610 may be part of the control unit 602 of the scanning suspension box 100, may be coupled to the scanning suspension box, or may be part of an external processor-based system connected to the scanning suspension box. In another example, the scanning suspension box 100 includes some storage for buffering captured data. The storage 608 may be implemented by a solid-state drive (SSD), a flash memory card, such as SD cards, microSD cards, xD picture cards, and the like, and a Universal Serial Bus (USB) flash drive.

The control unit 602 may also render the 3D model 612 based on the captured image data. The control unit 602 may also subtract out the walls of the suspension box as well as the suspension material in rendering the image data. In this configuration, the control unit 602 includes a central processing unit 614, a memory 616, and a software program 618, once loaded into the memory 616 and executed by the processor 614, capable of retrieving the stored capture data from the storage 610 and rendering the 3D model.

The control unit 602 may also include an interface 620 for coupling to an external device. The interface may be a network interface card (NIC), a Bluetooth transceiver, a USB connection, a Firewire connection, and so on. A number of different configurations of the control unit 602 is possible, as one or more of the operations and devices in FIG. 6 may be missing, with those operations instead being performed by an external device. For example, the 3D model rendering 612 may instead be performed by a connected computer, with the control unit 602 having no processor or memory. Or the software 618 may additionally be involved in the capture hardware operation 604 and capture hardware positioning 606. Or, the capture hardware operation 604 and capture hardware positioning 606 may be performed by programmable logic arrays (PLAs) including combinational logic that is preprogrammed to operate the cameras, lights, and depth sensors. System designers of ordinary skill in the art will recognize a number of different implementations of the control unit 602 as part of the scanning suspension box.

Figure 7:
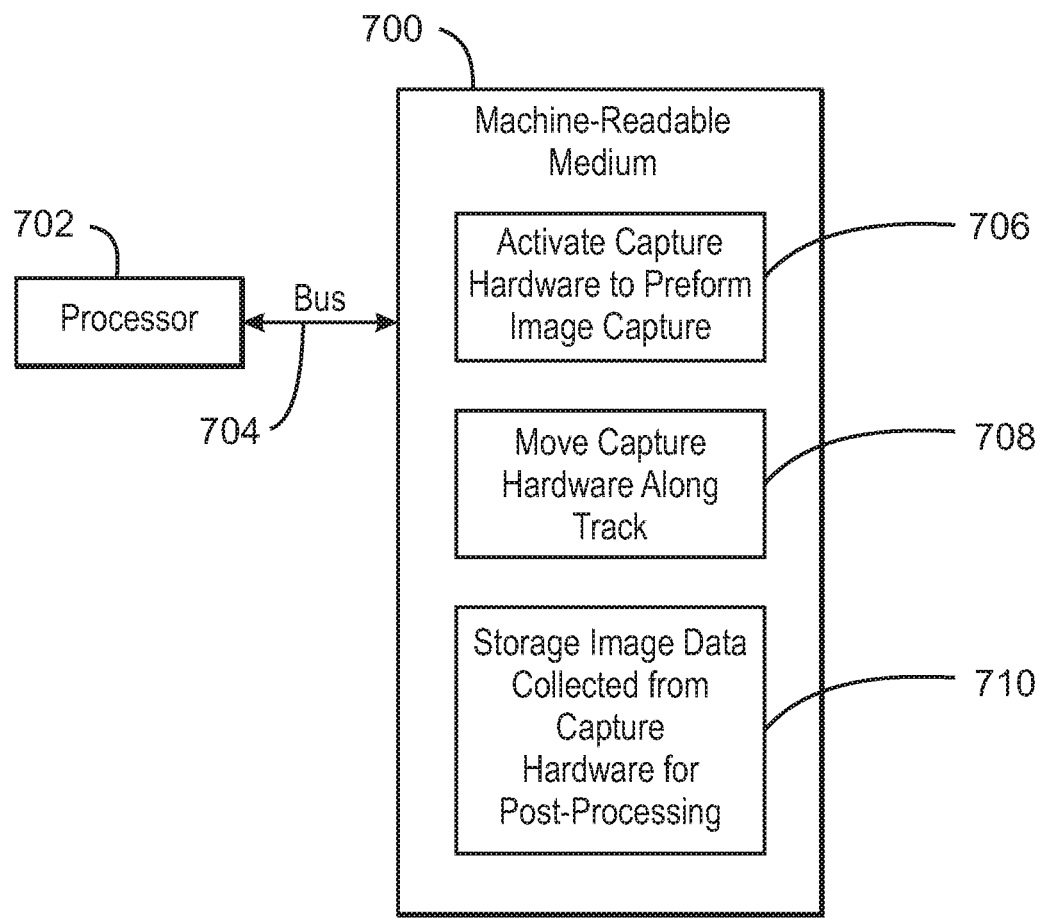
FIG. 7 is a simplified block diagram of a machine-readable medium including a processor capable of implementing operations performed by the scanning suspension box of FIG. 1A, according to some examples.

FIG. 7 is a block diagram of an exemplary non-transitory, machine readable medium 700 including code or instructions to direct a processor 702 to perform the operations of the scanning suspension box 100 of FIG. 1A. The processor 702 may access the non-transitory, machine readable medium 900 over a bus 704. The non-transitory, machine readable medium 700 may include devices described for the storage 608 or may include optical disks, thumb drives, or any number of other hardware devices.

The non-transitory, machine readable medium 700 may include code 706 to direct the processor 702 to activate the capture hardware 114 to perform image capture of the object 302 disposed inside the scanning suspension box 100, as described above. Where one or more tracks 502 are present in the enclosure 102 of the scanning suspension box 100, the machine readable medium 700 may also include code 708 to direct the processor 702 to move the capture hardware 114 along the track 708, and then to calibrate the capture hardware before imaging commences. The non-transitory, machine readable medium 700 may include code 710 to direct the processor 702 to store the image data collected from the capture hardware 114, such as in non-volatile storage 608 (FIG. 6).

In low power implementations, the storage 608 may be on-die memory or registers associated with a processor. However, in some examples, the storage 608 may be implemented using a micro hard disk drive (HDD). Further, any number of new technologies may be used for the storage 608 in addition to, or instead of, the technologies described, such resistance change memories, phase change memories, holographic memories, or chemical memories, among others.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. An apparatus comprising:
 a sealable box to receive an object to be scanned, the sealable box comprising a surface;
 a camera coupled to the surface; and
 a netting to receive the object such that the object does not move inside the sealable box once placed in the sealable box;
 wherein the camera is to make an image of the object to enable generation of a three-dimensional (3D) model of the object, and the netting is removed from the image.

2. The apparatus of claim 1, further comprising a depth sensor coupled to the surface for measuring a distance to the object.

3. The apparatus of claim 2, wherein the camera and depth sensor are disposed on a track disposed on the surface, wherein the camera and depth sensor are movable along the track.

4. The apparatus of claim 2, further comprising second, third, and fourth cameras disposed within the sealable box, wherein the second, third, and fourth cameras separately and non-simultaneously image the object to enable generation of the three-dimensional model.

5. The apparatus of claim 2, further comprising: a non-volatile computer storage medium to store the image and the distance received from the camera and depth sensor, respectively.

6. The apparatus of claim 1, wherein the sealable box comprises a shape and the shape is selected from a group consisting of a cube, a rectangular cube, a prism, a pyramid, a spherical shape, a cylindrical shape, a conical shape, a clamshell shape, a polyhedron shape, and an irregular shape.

7. The apparatus of claim 1, further comprising a lid to seal the sealable box, the lid further comprising a handle, wherein the apparatus is portable and, when sealed, may be held by the handle and moved.

8. A method comprising:
 capturing a plurality of images of a stationary object disposed in an enclosure once sealed, the stationary object to be suspended in the enclosure by a netting, the plurality of images comprising views of the stationary object from different angles within the sealed enclosure;
 wherein the plurality of images is used to generate a three-dimensional (3D) model of the object and the netting is removed from the image.

9. The method of claim 8, further comprising:
activating a light source associated with a camera prior to activating the camera, the light source and camera being attached to an inner surface within the sealed enclosure, wherein the camera is one of a plurality of cameras and the light source is one of a plurality of light sources, each camera being associated with a different light source;
wherein the plurality of cameras generates the plurality of images.

10. A non-transitory machine-readable medium having instructions stored therein that, in response to being executed on a computing device, cause the computing device to:
activate capture hardware to perform image capture of a stationary object disposed in a sealable box and netting which holds the object, the box comprising an enclosure inside which capture hardware is mounted, the image capture resulting in image data;
remove the netting from the image data; and
store the image data for subsequent processing as a three-dimensional model of the object.

11. The machine-readable medium of claim 10, further causing the computing device to:
activate a light source associated with a camera prior to activating the camera, the light source and camera being part of the capture hardware;
wherein the camera generates the image data.

12. The machine-readable medium of claim 10, further causing the computing device to:
perform depth analysis of the object, resulting in a distance measurement of the object.

13. The machine-readable medium of claim 10, further causing the computing device to:
move the capture hardware along a track until a camera and light source are at a desired location inside the box; and
calibrate the camera for image capture.

* * * * *